United States Patent
Chen

(10) Patent No.: US 10,210,330 B1
(45) Date of Patent: Feb. 19, 2019

(54) SYSTEMS AND METHODS FOR DETECTING MALICIOUS PROCESSES THAT ENCRYPT FILES

(71) Applicant: Symantec Corporation, Mountain View, CA (US)

(72) Inventor: Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 186 days.

(21) Appl. No.: 15/263,398

(22) Filed: Sep. 13, 2016

(51) Int. Cl.
G06F 21/55 (2013.01)
G06F 11/00 (2006.01)
G06F 12/14 (2006.01)
G06F 11/14 (2006.01)

(52) U.S. Cl.
CPC ........ G06F 21/554 (2013.01); G06F 11/1451 (2013.01); *G06F 2201/80* (2013.01)

(58) Field of Classification Search
CPC ...... G06F 21/55; G06F 21/554; G06F 21/556; G06F 11/1451; G06F 21/552
USPC ..................................................... 726/22–25
See application file for complete search history.

(56) References Cited

U.S. PATENT DOCUMENTS

| | | | | |
|---|---|---|---|---|
| 8,438,630 B1* | 5/2013 | Clifford | ........... | G06F 21/60 375/240.02 |
| 8,566,578 B1* | 10/2013 | Banerjee | ........... | H04L 9/088 709/217 |
| 9,935,973 B2* | 4/2018 | Crofton | ........... | H04L 63/145 |
| 2006/0272021 A1* | 11/2006 | Marinescu | ........... | G06F 21/56 726/24 |
| 2008/0120611 A1* | 5/2008 | Aaron | ........... | G06F 21/51 717/174 |
| 2013/0247193 A1* | 9/2013 | Zaitsev | ........... | G06F 21/552 726/23 |
| 2016/0065601 A1* | 3/2016 | Gong | ........... | G06F 21/561 726/23 |
| 2016/0371152 A1* | 12/2016 | Parshin | ........... | G06F 21/54 |
| 2017/0093886 A1* | 3/2017 | Ovcharik | ........... | G06F 21/563 |
| 2017/0140156 A1* | 5/2017 | Gu | ........... | G06F 21/602 |
| 2018/0211038 A1* | 7/2018 | Breiman | ........... | G06F 11/14 |

OTHER PUBLICATIONS

SentinelOne Frees Enterprises from Ransomware; https://sentinelone.com/article/sentinelone-frees-enterprises-from-ransomware/; as accessed on Sep. 13, 2016.

(Continued)

*Primary Examiner* — Shanto Abedin
(74) *Attorney, Agent, or Firm* — FisherBroyles, LLP

(57) ABSTRACT

The disclosed computer-implemented method for detecting malicious processes that encrypt files may include (i) identifying a backup file created by a backup process on the computing device, (ii) detecting an attempt to alter the backup file by a process that is not the backup process, (iii) determining, based at least in part on the attempt to alter the backup file being made by the process that is not the backup process, that the process is a malicious process designed to encrypt files on the computing device so that a legitimate owner of the files cannot access the files, and (iv) performing a security action in response to determining that the process is malicious. Various other methods, systems, and computer-readable media are also disclosed.

20 Claims, 6 Drawing Sheets

(56) References Cited

OTHER PUBLICATIONS

Use Time Machine to back up or restore your Mac; https://support.apple.com/en-us/HT201250; as accessed on Sep. 13, 2016.
Back up and restore your PC; https://support.microsoft.com/en-us/help/17127/windows-back-up-restore; as accessed on Sep. 13, 2016.
NetBackup; https://www.veritas.com/product/backup-and-recovery/netbackup; as accessed on Sep. 13, 2016.
Data Protector; http://www8.hp.com/us/en/software-solutions/data-protector-backup-recovery-software/index.html; as accessed on Sep. 13, 2016.
Uri Mann; Systems and Methods for Protecting Files From Malicious Encryption Attempts; U.S. Appl. No. 14/265,948, filed Apr. 30, 2014.
Windows Previous Versions against ransomware; https://isc.sans.edu/forums/diary/Windows+Previous+Versions+against+ransomware/18439/; as accessed on Sep. 13, 2016.

* cited by examiner

SYSTEMS AND METHODS FOR DETECTING MALICIOUS PROCESSES THAT ENCRYPT FILES

BACKGROUND

The variety of malware on the Internet is ever-growing. One such variant of malware is ransomware, which attempts to encrypt important files on a user's computing system and then holds the encrypted files for ransom. If the user does not pay the ransom, the important files remain encrypted and may be impossible for the user to access. Unfortunately, the encryption of important files may result in data loss and/or may compromise functionality on the computing system. In addition, paying the ransom can also introduce other problems since the malicious developers will then have access to the user's payment information.

Traditional security systems are often designed to prevent malware from being inadvertently installed by a user, but may have no means of detecting or removing malware once it has been installed. In particular, traditional security systems that are designed to detect viruses, Trojans, keyloggers, and other threats that create new files or monitor user input but do not make changes to existing files may not be able to detect ransomware at all. Moreover, even if a traditional security system is able to remove installed ransomware, it may be too late since the user's files have already been encrypted and the damage has been done. Early detection is crucial for limiting the ability of ransomware to interfere with a user's computing device. The instant disclosure, therefore, identifies and addresses a need for systems and methods for detecting malicious processes that encrypt files.

SUMMARY

As will be described in greater detail below, the instant disclosure describes various systems and methods for detecting malicious processes that encrypt files by monitoring backup files for changes initiated by suspicious processes.

In one example, a computer-implemented method for detecting malicious processes that encrypt files may include (i) identifying a backup file created by a backup process on the computing device, (ii) detecting an attempt to alter the backup file by a process that is not the backup process, (iii) determining, based at least in part on the attempt to alter the backup file being made by the process that is not the backup process, that the process is a malicious process designed to encrypt files on the computing device so that a legitimate owner of the files cannot access the files, and (iv) performing a security action in response to determining that the process is malicious.

In some examples, performing the security action may include notifying an administrator of the computing device about the attempt to alter the backup file by the malicious process. In some examples, performing the security action may include blocking the attempt to alter the backup file. Additionally or alternatively, performing the security action may include removing the malicious process from the computing device.

In some embodiments, detecting the attempt to alter the backup file by the process that is not the backup process may include determining that the process is not on a list of backup processes expected to alter the backup file. In some examples, detecting the attempt to alter the backup file may include monitoring the backup file for attempts to alter the backup file.

In one embodiment, the computing device may include a backup server and the backup file may include a backup of a file stored on an additional computing device that does not include the backup server. In another embodiment, the computing device may include an endpoint computing device and the backup file may include a backup of a file stored on the endpoint computing device.

In one embodiment, a system for implementing the above-described method may include (i) an identification module, stored in memory, that identifies a backup file created by a backup process on the computing device, (ii) a detection module, stored in memory, that detects an attempt to alter the backup file by a process that is not the backup process, (iii) a determination module, stored in memory, that determines, based at least in part on the attempt to alter the backup file being made by the process that is not the backup process, that the process is a malicious process designed to encrypt files on the computing device so that a legitimate owner of the files cannot access the files, (iv) a security module, stored in memory, that performs a security action in response to determining that the process is malicious, and (v) at least one physical processor configured to execute the identification module, the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a backup file created by a backup process on the computing device, (ii) detect an attempt to alter the backup file by a process that is not the backup process, (iii) determine, based at least in part on the attempt to alter the backup file being made by the process that is not the backup process, that the process is a malicious process designed to encrypt files on the computing device so that a legitimate owner of the files cannot access the files, and (iv) perform a security action in response to determining that the process is malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
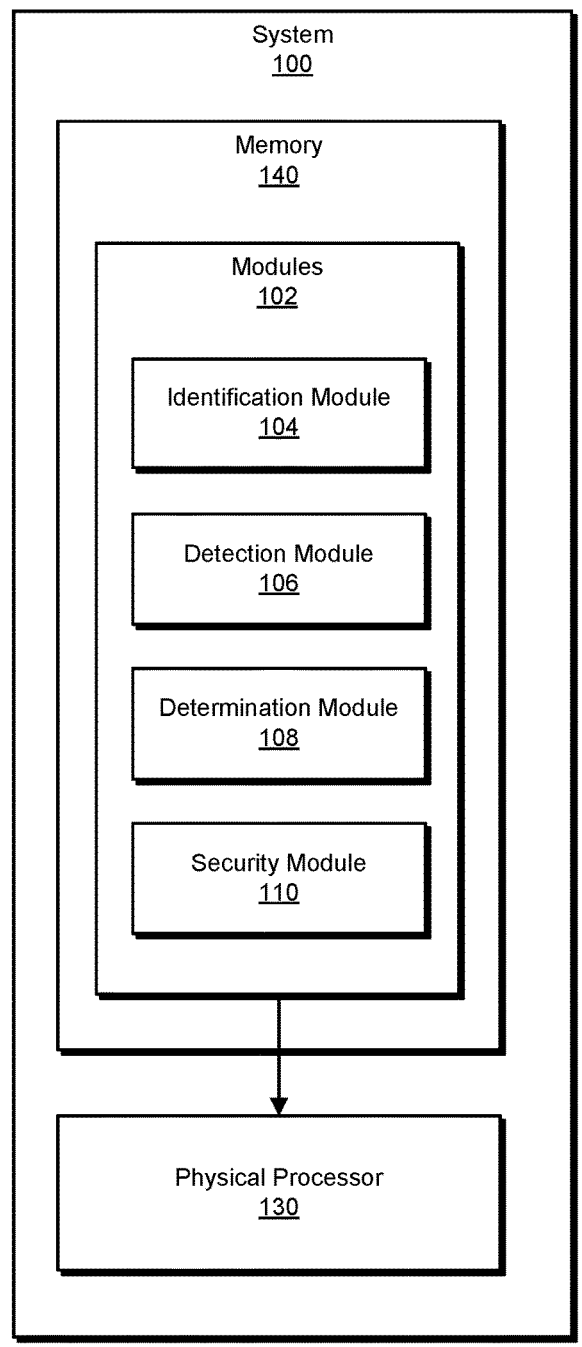
FIG. 1 is a block diagram of an example system for detecting malicious processes that encrypt files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malicious processes that encrypt files. As will be explained in greater detail below, by monitoring attempts by processes to alter backup files and performing security actions on processes that are determined to be malicious, the systems described herein may prevent ransomware from successfully encrypting files. In addition, the systems and methods described herein may improve the functioning of a computing device by reducing the computing device's susceptibility to ransomware attacks. Detecting ransomware before backup files can be encrypted may prevent malicious applications from causing harm to users' computing systems and may also prevent users from having to pay a ransom or else risk losing access to important files.

Figure 2:
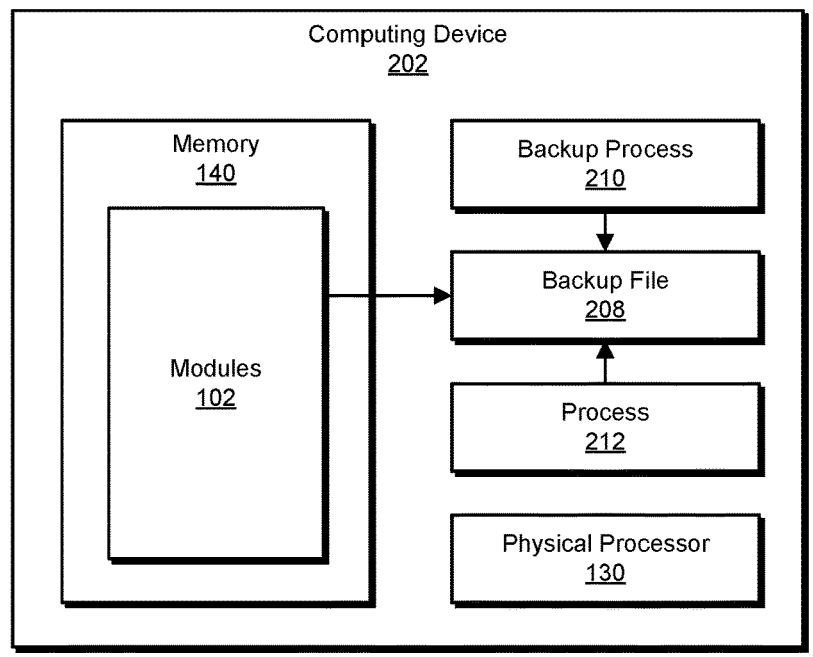
FIG. 2 is a block diagram of an additional example system for detecting malicious processes that encrypt files.
Figure 3:
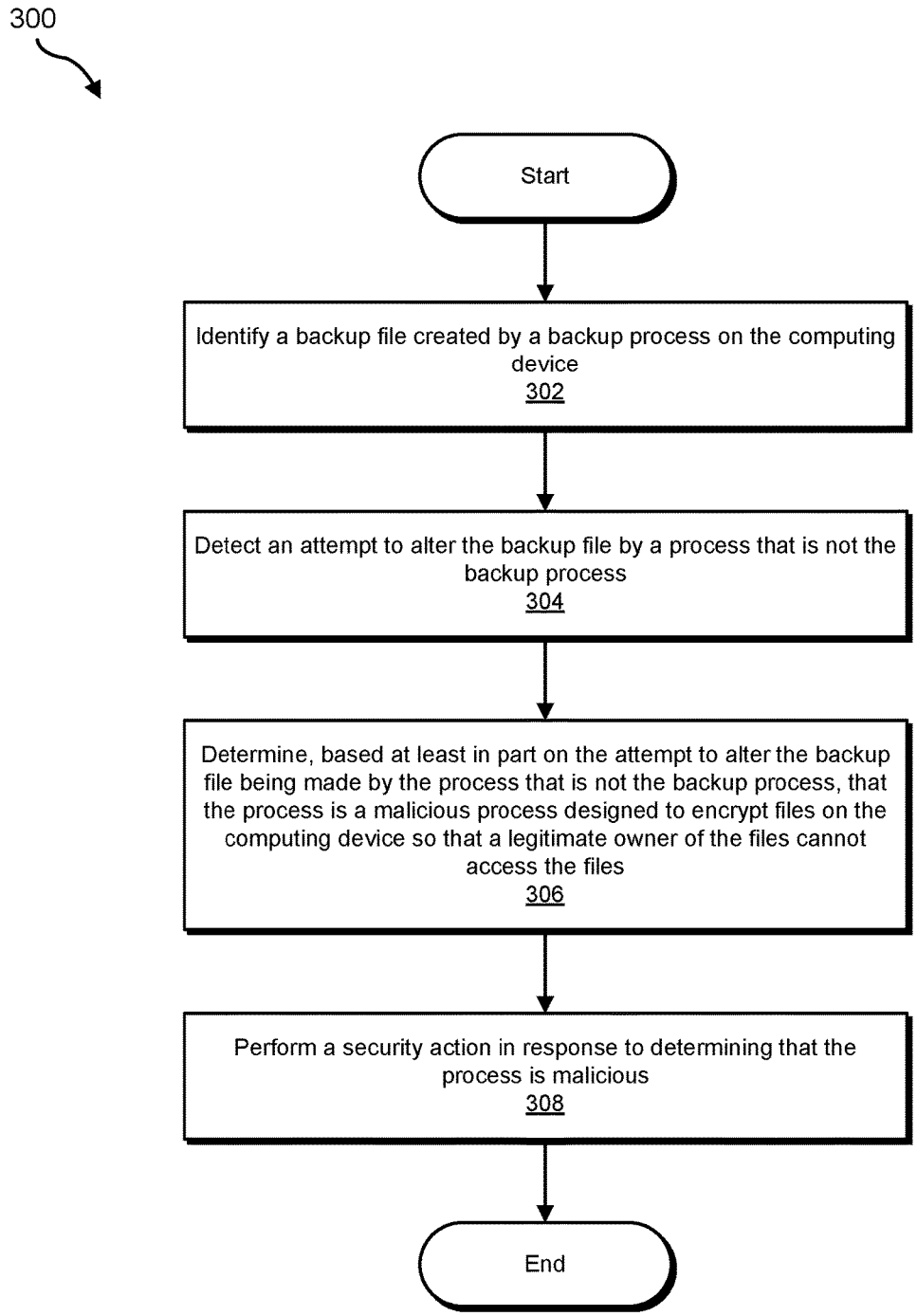
FIG. 3 is a flow diagram of an example method for detecting malicious processes that encrypt files.
Figure 4:
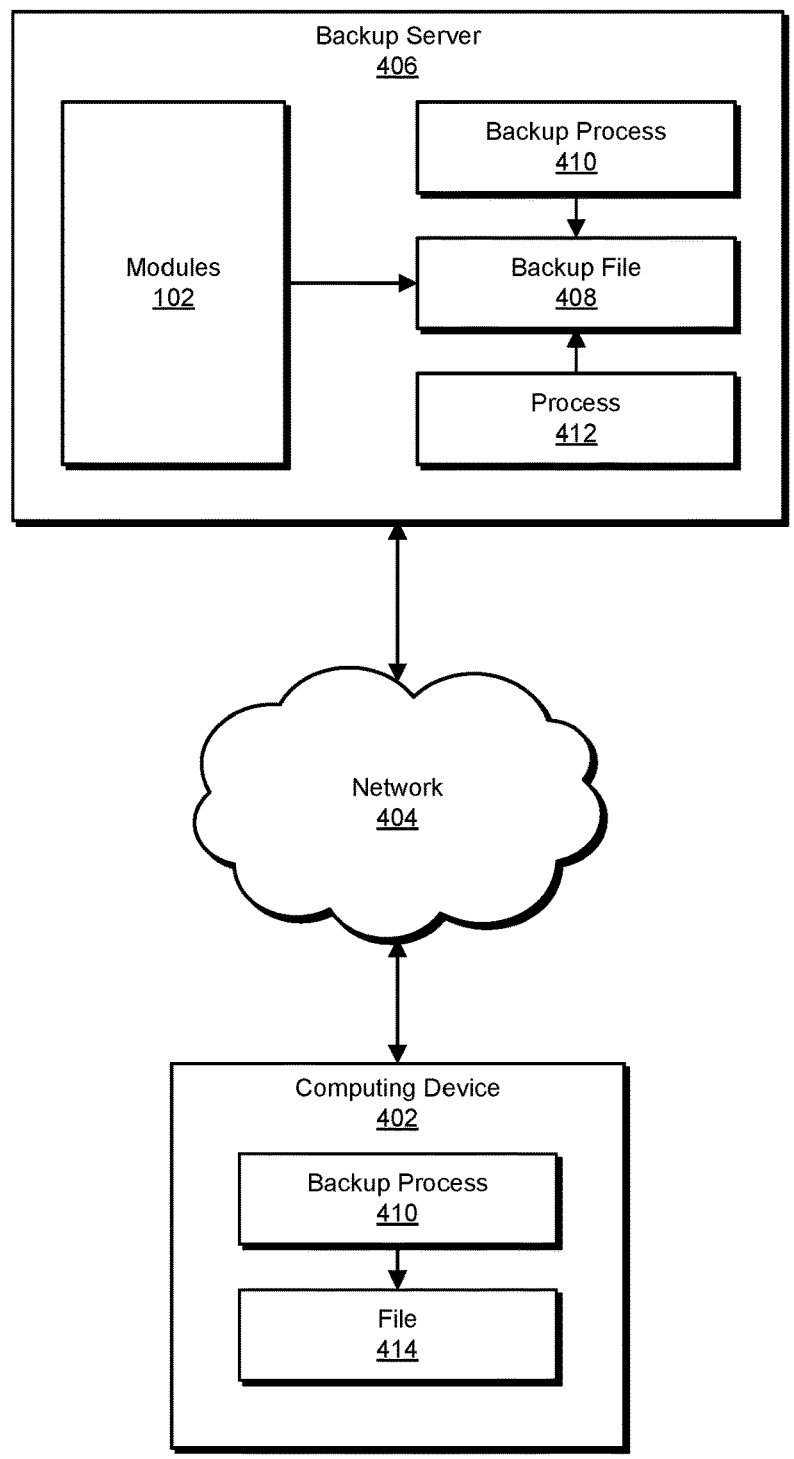
FIG. 4 is a block diagram of an example computing system for detecting malicious processes that encrypt files.

The following will provide, with reference to FIGS. 1, 2, and 4, detailed descriptions of example systems for detecting malicious processes that encrypt files. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of example system 100 for detecting malicious processes that encrypt files. As illustrated in this figure, example system 100 may include one or more modules 102 for performing one or more tasks. For example, and as will be explained in greater detail below, example system 100 may include an identification module 104 that identifies a backup file created by a backup process on the computing device. Example system 100 may additionally include a detection module 106 that detects an attempt to alter the backup file by a process that is not the backup process. Example system 100 may also include a determination module 108 that determines, based at least in part on the attempt to alter the backup file being made by the process that is not the backup process, that the process is a malicious process designed to encrypt files on the computing device so that a legitimate owner of the files cannot access the files. Example system 100 may additionally include a security module 110 that performs a security action in response to determining that the process is malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malicious processes that encrypt files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect malicious processes that encrypt files.

Computing device 202 generally represents any type or form of computing device capable of reading computer-executable instructions. In some embodiments, computing device 202 may represent an endpoint computing device. In other embodiments, computing device 202 may represent a server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Backup file 208 generally represents any type or form of backup of one or more files. In some examples, backup file 208 may be a copy of an individual file. In other examples, backup file 208 may be a backup image of multiple files and/or an entire operating system, a compressed version of one or more files, a block within an image file, and/or any other suitable means for backing up files. Backup process 210 generally represents any process, application, and/or script capable of creating and/or updating a backup of a file. In some embodiments, backup process 210 may be a part of an operating system, such as WINDOWS SYSTEM RESTORE and/or OS X TIME MACHINE. In other embodiments, backup process 210 may be a third-party process to the operating system, such as VERITAS NET-BACKUP and/or HP DATA PROTECTOR. Process 212 generally represents any process not expected to interact with a backup file. In some examples, process 212 may be and/or may appear to be a known benign process, while in other examples process 212 may be an unknown process and/or a known malicious process.

FIG. 3 is a flow diagram of an example computer-implemented method 300 for detecting malicious processes that encrypt files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a backup file created by a backup process on the computing device. For example, identification module 104 may, as part of computing device 202 in FIG. 2, identify backup file 208 created by backup process 210 on computing device 202.

Identification module 104 may identify the backup file in a variety of contexts. For example, identification module 104 may be part of a security application that monitors a variety of activity for signs of malware. In other embodiments, identification module 104 may be part of a specialized application that only monitors activity relating to backup files. In some embodiments, identification module 104 may automatically detect backup files based on various characteristics (e.g., file type, location, and/or program created by). In other embodiments, a user may direct identification module 104 to any backup files that the user desires to have monitored.

At step 304, one or more of the systems described herein may detect an attempt to alter the backup file by a process that is not the backup process. For example, detection module 106 may, as part of computing device 202 in FIG. 2, detect an attempt to alter backup file 208 by process 212 that is not backup process 210.

The term "attempt to alter," as used herein, generally refers to any action that would result in the modification of a backup file. In some examples, the process may attempt to alter the backup file by deleting, encrypting, and/or renaming the backup file. Other examples of attempts to alter a file include, without limitation, updating the file, adding content to the file, removing content from the file, changing content within the file, changing metadata of the file and/or moving the file.

Detection module 106 may detect the attempt to alter the backup file in a variety of ways. In some examples, detection module 106 may detect the attempt to alter the backup file by monitoring the backup file for attempts to alter the backup file. In some embodiments, detection module 106 may monitor all backup files on the computing device for attempts to alter the backup files.

In some embodiments, detection module 106 may detect the attempt to alter the backup file by the process that is not the backup process by determining that the process is not on a list of backup processes expected to alter the backup file. For example, detection module 106 may have a list of backup, restore, recovery, and/or related processes expected to make changes to and/or access the backup file. In some embodiments, detection module 106 may be pre-configured with a list of common backup-related processes. Additionally or alternatively, detection module 106 may accept user input about which processes operating on the computing device are expected to interact with backup files.

At step 306, one or more of the systems described herein may determine, based at least in part on the attempt to alter the backup file being made by the process that is not the backup process, that the process is a malicious process designed to encrypt files on the computing device so that a legitimate owner of the files cannot access the files. For example, determination module 108 may, as part of computing device 202 in FIG. 2, determine, based at least in part on the attempt to alter backup file 208 being made by process 212 that is not backup process 210, that process 212 is a malicious process designed to encrypt files on computing device 202 so that a legitimate owner of the files cannot access the files.

The term "malicious process," as used herein, generally refers to any process designed to cause changes to a computing device that impede the computing device's functioning or usability. In some examples, the malicious process may be ransomware that encrypts files on the computing device and will only decrypt the files after the ransomware's author or authors have been paid.

Determination module 108 may determine that the process is malicious in a variety of ways. For example, determination module 108 may determine that any process that is not expected to interact with backup files and that attempts to alter a backup file is a malicious process. In other embodiments, determination module 108 may perform further checks on a process before determining the process to be malicious. For example, determination module 108 may check the reputation of the process, determine the origin of the process, and/or analyze previous actions of the process.

At step 308, one or more of the systems described herein may perform a security action in response to determining that the process is malicious. For example, security module 110 may, as part of computing device 202 in FIG. 2, perform a security action in response to determining that process 212 is malicious.

Security module 110 may perform a variety of security actions in response to determining that a process is malicious. In some embodiments, security module 110 may perform the security action by blocking the attempt to alter the backup file. For example, security module 110 may prevent the command to alter the backup file from executing and/or may prevent the malicious process from interacting with the backup file. In some examples, security module 110 may perform the security action by removing the malicious process from the computing device. In one example, security module 110 may inform one or more security applications about the malicious process. In some embodiments, an administrator of the computing device may configure security module 110 to perform a specific security action or actions each time a malicious process is detected without further input from the administrator.

Additionally or alternatively, security module 110 may perform the security action by notifying an administrator of the computing device about the attempt to alter the backup file by the malicious process. In some examples, the administrator may then instruct security module 110 to perform additional security actions, such as blocking the attempt to alter the backup file and/or removing the malicious process.

In some examples, security module 110 may enable an administrator to reverse security actions, such as by enabling an administrator to reverse the blocking of the attempt to alter the file and instead allow the process to alter the file if the administrator determines that the process is not malicious.

In one embodiment, the computing device may include an endpoint computing device and the backup file may include a backup of a file stored on the endpoint computing device. For example, the computing device may be a personal computer, a laptop, and/or a tablet that stores local backups of its own files.

In other embodiments, the computing device may include a backup server and the backup file may include a backup of a file stored on an additional computing device that does not comprise the backup server. For example, the computing device may be a backup server that stores backup files for any number of endpoint computing devices and/or other servers on a local and/or remote network. In one example, as illustrated in FIG. 4, a backup server 406 may communicate with a computing device 402 via a network 404. In some examples, a backup process 410 on computing device 402 may create backup file 408 of file 414 on computing device 402 and may send backup file 408 to backup server 406. On backup server 406, modules 102 may monitor backup file 408. In some examples, modules 102 on server 406 may determine that a process 412 that is attempting to alter backup file 408 is a malicious process and may perform one or more security actions on process 412, such as alerting an administrator and/or blocking the attempt by process 412 to alter backup file 408.

As explained in connection with method 300 above, the systems and methods described herein may protect computing systems from ransomware by monitoring backup files to detect attempts to alter the backup files by unexpected processes. Because ransomware depends on the user having no method for recovering their files except paying the ransom, some instances of ransomware may detect and encrypt backup files to ensure that a user cannot simply recover their files from backups. By looking for attempts to encrypt backup files, the systems described herein may be able to quickly identify ransomware that may otherwise be missed and may also be able to prevent backup files from being encrypted, allowing users to avoid paying a ransom for their data.

Figure 5:
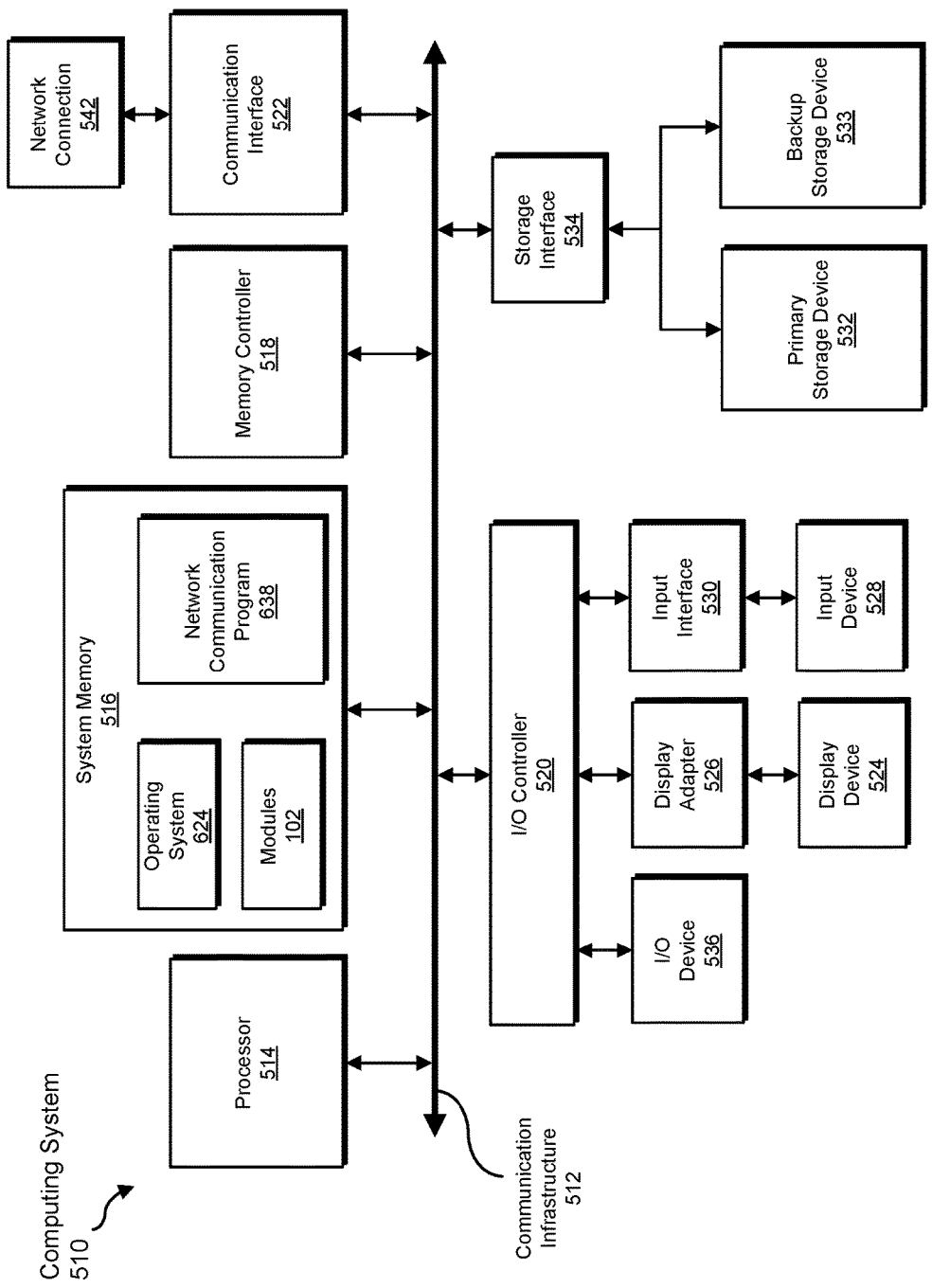
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
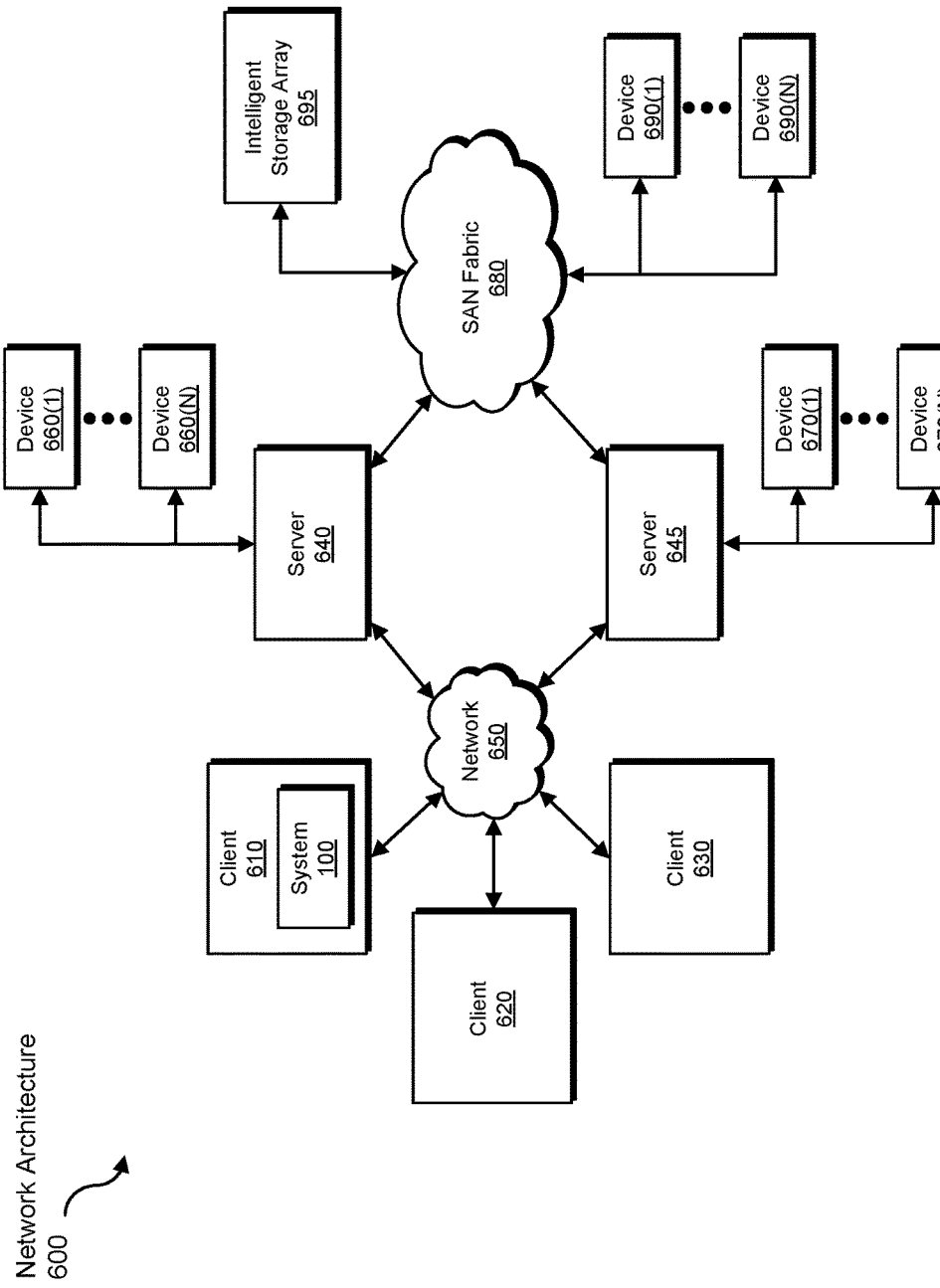
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting malicious processes that encrypt files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive event data to be transformed, transform the event data by determining whether the event data represents an attempt to alter a backup file, output a result of the transformation to a security application, use the result of the transformation to detect an attempt to alter a backup file, and store the result of the transformation to a log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing malicious computer processes from encrypting computer files, at least a portion of the method being performed by a computing device comprising at least one computer processor, the method comprising:
   identifying, by the computing device, a backup computer file previously created by a backup computer process on the computing device;
   automatically detecting, by the computing device, an attempt to electronically alter the backup computer file by a computer process that is not the backup computer process, wherein the computer process appears to be a known benign process not expected to interact with the backup computer file;
   determining, by the computing device based at least in part on the attempt to electronically alter the backup computer file being made by the computer process, that the computer process is a malicious computer process designed to encrypt backup computer files on the computing device so that a legitimate owner of the computer files cannot access the backup computer files, wherein determining that the computer process is the malicious computer process comprises determining, based on the computer process appearing to be a known benign process not expected to interact with the backup computer file, an origin of the computer process and analyzing previous actions of the computer process; and
   performing a security action in response to determining that the computer process is malicious.

2. The computer-implemented method of claim 1, wherein performing the security action comprises notifying an administrator of the computing device about the attempt to electronically alter the backup computer file by the malicious computer process.

3. The computer-implemented method of claim 1, wherein performing the security action comprises blocking the attempt to electronically alter the backup computer file.

4. The computer-implemented method of claim 1, wherein performing the security action comprises removing the malicious computer process from the computing device.

5. The computer-implemented method of claim 1, wherein detecting the attempt to electronically alter the backup computer file by the computer process that is not the backup computer process comprises determining that the computer process is not on a list of backup computer processes expected to electronically alter the backup computer file.

6. The computer-implemented method of claim 1, wherein detecting the attempt to electronically alter the backup computer file comprises monitoring the backup computer file for attempts to electronically alter the backup computer file.

7. The computer-implemented method of claim 1, wherein:
   the computing device comprises a backup server; and
   the backup computer file comprises a backup of a computer file stored on an additional computing device that does not comprise the backup server.

8. The computer-implemented method of claim 1, wherein:
   the computing device comprises an endpoint computing device; and
   the backup computer file comprises a backup of a computer file stored on the endpoint computing device.

9. A system for detecting malicious computer processes that encrypt files, the system comprising:
   an identification module, stored in memory, that identifies a backup computer file previously created by a backup computer process on a computing device;
   a detection module, stored in memory, that automatically detects an attempt to electronically alter the backup computer file by a computer process that is not the backup computer process, wherein the computer process appears to be a known benign process not expected to interact with the backup computer file;
   a determination module, stored in memory, that determines, based at least in part on the attempt to electronically alter the backup computer file being made by the computer process, that is not the backup computer process, that the computer process is a malicious computer process designed to encrypt backup computer files on the computing device so that a legitimate owner of the backup computer files cannot access the backup computer files, wherein the computer process is determined to be the malicious computer process by determining, based on the computer process appearing to be a known benign process not expected to interact with the backup computer file, an origin of the computer process and analyzing previous actions of the computer process;
   a security module, stored in memory, that performs a security action in response to determining that the computer process is malicious; and
   at least one physical processor configured to execute the identification module, the detection module, the determination module, and the security module.

10. The system of claim 9, wherein the security module performs the security action by notifying an administrator of the computing device about the attempt to electronically alter the backup computer file by the malicious computer process.

11. The system of claim 9, wherein the security module performs the security action by blocking the attempt to electronically alter the backup computer file.

12. The system of claim 9, wherein the security module performs the security action by removing the malicious computer process from the computing device.

13. The system of claim 9, wherein the detection module detects the attempt to electronically alter the backup computer file by the computer process that is not the backup computer process by determining that the computer process is not on a list of backup computer processes expected to electronically alter the backup computer file.

14. The system of claim 9, wherein the detection module detects the attempt to electronically alter the backup computer file by monitoring the backup computer file for attempts to alter the backup computer file.

15. The system of claim 9, wherein:
   the computing device comprises a backup server; and
   the backup computer file comprises a backup of a computer file stored on an additional computing device that does not comprise the backup server.

16. The system of claim 9, wherein:
- the computing device comprises an endpoint computing device; and
- the backup computer file comprises a backup of a computer file stored on the endpoint computing device.

17. A non-transitory computer-readable medium comprising one or more computer-readable instructions that, when executed by at least one processor of a computing device, cause the computing device to:
- identify, by the computing device, a backup computer file previously created by a backup computer process on the computing device;
- automatically detect, by the computing device, an attempt to electronically alter the backup computer file by a computer process that is not the backup computer process, wherein the computer process appears to be a known benign process not expected to interact with the backup computer file;
- determine, by the computing device based at least in part on the attempt to electronically alter the backup computer file being made by the computer process that is not the backup computer process, that the computer process is a malicious computer process designed to encrypt backup computer files on the computing device so that a legitimate owner of the backup computer files cannot access the backup computer files, wherein the computer process is determined to be the malicious computer process by determining, based on the computer process appearing to be a known benign process not expected to interact with the backup computer file, an origin of the computer process and analyzing previous actions of the computer process; and
- perform a security action in response to determining that the computer process is malicious.

18. The non-transitory computer-readable medium of claim 17, wherein the one or more computer-readable instructions cause the computing device to perform the security action by notifying an administrator of the computing device about the attempt to electronically alter the backup computer file by the malicious computer process.

19. The non-transitory computer-readable medium of claim 17, wherein the one or more computer-readable instructions cause the computing device to perform the security action by blocking the attempt to electronically alter the backup computer file.

20. The non-transitory computer-readable medium of claim 17, wherein the one or more computer-readable instructions cause the computing device to perform the security action by removing the malicious computer process from the computing device.

* * * * *

UNITED STATES PATENT AND TRADEMARK OFFICE
CERTIFICATE OF CORRECTION

PATENT NO. : 10,210,330 B1
APPLICATION NO. : 15/263398
DATED : February 19, 2019
INVENTOR(S) : Joseph Chen It is certified that error appears in the above-identified patent and that said Letters Patent is hereby corrected as shown below:

In the Claims

In Column 15, Lines 12-13, Claim 1, delete "preventing malicious computer processes from encrypting computer files," and insert -- detecting malicious processes that encrypt files, --, therefor.

In Column 15, Line 15, Claim 1, delete "one computer processor," and insert -- one processor, --, therefor.

In Column 15, Lines 17-18, Claim 1, delete "identifying, by the computing device, a backup computer file previously created by a backup computer process" and insert -- identifying a backup file created by a backup process --, therefor.

In Column 15, Lines 20-21, Claim 1, delete "automatically detecting, by the computing device, an attempt to electronically alter" and insert -- detecting an attempt to alter --, therefor.

In Column 15, Lines 21-22, Claim 1, delete "backup computer file by a computer process" and insert -- backup file by a process --, therefor.

In Column 15, Lines 22-23, Claim 1, delete "backup computer process," and insert -- backup process, --, therefor.

In Column 15, Line 26, Claim 1, delete "determining, by the computing device" and insert -- determining, --, therefor.

In Column 15, Line 27, Claim 1, delete "attempt to electronically alter" and insert -- attempt to alter --, therefor.

In Column 15, Lines 27-28, Claim 1, delete "backup computer file" and insert -- backup file --, therefor.

Signed and Sealed this
Eighteenth Day of June, 2019

Andrei Iancu
*Director of the United States Patent and Trademark Office*

CERTIFICATE OF CORRECTION (continued)
U.S. Pat. No. 10,210,330 B1

In Column 15, Line 28, Claim 1, delete "the computer process," and insert -- the process that is not the backup process, --, therefor.

In Column 15, Line 29, Claim 1, delete "the computer process" and insert -- the process --, therefor.

In Column 15, Line 29, Claim 1, delete "malicious computer process" and insert -- malicious process --, therefor.

In Column 15, Line 30, Claim 1, delete "computer files" and insert -- files --, therefor.

In Column 15, Line 32, Claim 1, delete "computer files," and insert -- files, --, therefor.

In Column 15, Line 41, Claim 1, delete "computer process" and insert -- process --, therefor.

In Column 15, Lines 44-45, Claim 2, delete "attempt to electronically alter" and insert -- attempt to alter --, therefor.

In Column 15, Line 45, Claim 2, delete "backup computer file" and insert -- backup file --, therefor.

In Column 15, Line 46, Claim 2, delete "malicious computer process." and insert -- malicious process. --, therefor.

In Column 15, Line 49, Claim 3, delete "attempt to electronically alter" and insert -- attempt to alter --, therefor.

In Column 15, Line 49, Claim 3, delete "backup computer file." and insert -- backup file. --, therefor.

In Column 15, Line 52, Claim 4, delete "malicious computer process" and insert -- malicious process --, therefor.

In Column 15, Line 54, Claim 5, delete "attempt to electronically alter" and insert -- attempt to alter --, therefor.

In Column 15, Line 55, Claim 5, delete "backup computer file" and insert -- backup file --, therefor.

In Column 15, Line 55, Claim 5, delete "the computer process" and insert -- the process --, therefor.

In Column 15, Line 56, Claim 5, delete "backup computer process" and insert -- backup process --, therefor.

In Column 15, Lines 56-57, Claim 5, delete "the computer process" and insert -- the process --, therefor.

In Column 15, Lines 57-58, Claim 5, delete "backup computer processes" and insert -- backup processes --, therefor.

CERTIFICATE OF CORRECTION (continued)
U.S. Pat. No. 10,210,330 B1

In Column 15, Line 58, Claim 5, delete "electronically alter" and insert -- alter --, therefor.

In Column 15, Lines 58-59, Claim 5, delete "backup computer file." and insert -- backup file. --, therefor.

In Column 15, Line 61, Claim 6, delete "attempt to electronically alter" and insert -- attempt to alter --, therefor.

In Column 15, Line 62, Claim 6, delete "backup computer file" and insert -- backup file --, therefor.

In Column 15, Lines 62-63, Claim 6, delete "backup computer file" and insert -- backup file --, therefor.

In Column 15, Line 63, Claim 6, delete "attempts to electronically alter" and insert -- attempts to alter --, therefor.

In Column 15, Lines 63-64, Claim 6, delete "backup computer file." and insert -- backup file. --, therefor.

In Column 16, Line 1, Claim 7, delete "backup computer file" and insert -- backup file --, therefor.

In Column 16, Lines 1-2, Claim 7, delete "backup of a computer file" and insert -- backup of a file --, therefor.

In Column 16, Line 8, Claim 8, delete "backup computer file" and insert -- backup file --, therefor.

In Column 16, Lines 8-9, Claim 8, delete "backup of a computer file" and insert -- backup of a file --, therefor.

In Column 16, Line 10, Claim 9, delete "malicious computer processes" and insert -- malicious processes --, therefor.

In Column 16, Lines 13-14, Claim 9, delete "backup computer file previously created by a backup computer process" and insert -- backup file created by a backup process --, therefor.

In Column 16, Lines 15-17, Claim 9, delete "automatically detects an attempt to electronically alter the backup computer file by a computer process" and insert -- detects an attempt to alter the backup file by a process --, therefor.

In Column 16, Line 18, Claim 9, delete "backup computer process," and insert -- backup process, --, therefor.

In Column 16, Lines 22-23, Claim 9, delete "attempt to electronically alter the backup computer file" and insert -- attempt to alter the backup file --, therefor.

In Column 16, Line 24, Claim 9, delete "the computer process," and insert -- the process --, therefor.

CERTIFICATE OF CORRECTION (continued)
U.S. Pat. No. 10,210,330 B1

In Column 16, Lines 24-25, Claim 9, delete "backup computer process," and insert -- backup process, --, therefor.

In Column 16, Lines 25-26, Claim 9, delete "the computer process is a malicious computer process" and insert -- the process is a malicious process --, therefor.

In Column 16, Lines 26-27, Claim 9, delete "computer files" and insert -- files --, therefor.

In Column 16, Line 28, Claim 9, delete "computer files" and insert -- files --, therefor.

In Column 16, Lines 28-29, Claim 9, delete "computer files," and insert -- files, --, therefor.

In Column 16, Line 38, Claim 9, delete "computer process" and insert -- process --, therefor.

In Column 16, Lines 44-45, Claim 10, delete "attempt to electronically alter" and insert -- attempt to alter --, therefor.

In Column 16, Line 45, Claim 10, delete "backup computer file" and insert -- backup file --, therefor.

In Column 16, Lines 45-46, Claim 10, delete "malicious computer process." and insert -- malicious process. --, therefor.

In Column 16, Lines 48-49, Claim 11, delete "attempt to electronically alter" and insert -- attempt to alter --, therefor.

In Column 16, Line 49, Claim 11, delete "backup computer file." and insert -- backup file. --, therefor.

In Column 16, Lines 51-52, Claim 12, delete "malicious computer process" and insert -- malicious process --, therefor.

In Column 16, Line 54, Claim 13, delete "attempt to electronically alter" and insert -- attempt to alter --, therefor.

In Column 16, Lines 54-55, Claim 13, delete "backup computer file" and insert -- backup file --, therefor.

In Column 16, Line 55, Claim 13, delete "the computer process" and insert -- the process --, therefor.

In Column 16, Lines 55-56, Claim 13, delete "backup computer process" and insert -- backup process --, therefor.

In Column 16, Line 56, Claim 13, delete "the computer process" and insert -- the process --, therefor.

In Column 16, Line 57, Claim 13, delete "backup computer processes" and insert -- backup processes --, therefor.

CERTIFICATE OF CORRECTION (continued)
U.S. Pat. No. 10,210,330 B1

In Column 16, Lines 57-58, Claim 13, delete "to electronically alter" and insert -- to alter --, therefor.

In Column 16, Line 58, Claim 13, delete "backup computer file." and insert -- backup file. --, therefor.

In Column 16, Line 60, Claim 14, delete "attempt to electronically alter" and insert -- attempt to alter --, therefor.

In Column 16, Lines 60-61, Claim 14, delete "backup computer file" and insert -- backup file --, therefor.

In Column 16, Line 61, Claim 14, delete "backup computer file" and insert -- backup file --, therefor.

In Column 16, Line 62, Claim 14, delete "backup computer file." and insert -- backup file. --, therefor.

In Column 16, Line 65, Claim 15, delete "backup computer file" and insert -- backup file --, therefor.

In Column 16, Lines 65-66, Claim 15, delete "backup of a computer file" and insert -- backup of a file --, therefor.

In Column 17, Line 4, Claim 16, delete "backup computer file" and insert -- backup file --, therefor.

In Column 17, Lines 4-5, Claim 16, delete "backup of a computer file" and insert -- backup of a file --, therefor.

In Column 17, Lines 10-11, Claim 17, delete "identify, by the computing device, a backup computer file previously created" and insert -- identify a backup file created --, therefor.

In Column 17, Line 11, Claim 17, delete "backup computer process" and insert -- backup process --, therefor.

In Column 17, Lines 13-14, Claim 17, delete "automatically detect, by the computing device, an attempt to electronically alter" and insert -- detect an attempt to alter --, therefor.

In Column 17, Lines 14-15, Claim 17, delete "backup computer file by a computer process" and insert -- backup file by a process --, therefor.

In Column 17, Lines 15-16, Claim 17, delete "backup computer process," and insert -- backup process, --, therefor.

In Column 17, Line 19, Claim 17, delete "determine, by the computing device" and insert -- determine, --, therefor.

In Column 17, Line 20, Claim 17, delete "attempt to electronically alter" and insert -- attempt to alter --, therefor.

CERTIFICATE OF CORRECTION (continued)
U.S. Pat. No. 10,210,330 B1

In Column 17, Lines 20-21, Claim 17, delete "backup computer file" and insert -- backup file --, therefor.

In Column 17, Line 21, Claim 17, delete "the computer process" and insert -- the process --, therefor.

In Column 17, Line 22, Claim 17, delete "backup computer process," and insert -- backup process, --, therefor.

In Column 17, Lines 22-23, Claim 17, delete "the computer process is a malicious computer process" and insert -- the process is a malicious process --, therefor.

In Column 17, Line 24, Claim 17, delete "computer files" and insert -- files --, therefor.

In Column 17, Line 25, Claim 17, delete "computer files" and insert -- files --, therefor.

In Column 17, Line 26, Claim 17, delete "computer files," and insert -- files, --, therefor.

In Column 18, Line 8, Claim 17, delete "computer process" and insert -- process --, therefor.

In Column 18, Line 13 (approx.), Claim 18, delete "attempt to electronically alter" and insert -- attempt to alter --, therefor.

In Column 18, Line 14 (approx.), Claim 18, delete "backup computer file" and insert -- backup file --, therefor.

In Column 18, Line 14 (approx.), Claim 18, delete "malicious computer process." and insert -- malicious process. --, therefor.

In Column 18, Line 18 (approx.), Claim 19, delete "attempt to electronically alter" and insert -- attempt to alter --, therefor.

In Column 18, Line 19 (approx.), Claim 19, delete "backup computer file." and insert -- backup file. --, therefor.

In Column 18, Line 23 (approx.), Claim 20, delete "malicious computer process" and insert -- malicious process --, therefor.